Oct. 10, 1950   A. J. A. PETERSON ET AL   2,525,499
DISTRIBUTION APPARATUS
Filed May 23, 1944

WITNESSES:
E. A. McCloskey.
F. V. Giolma

INVENTORS
Alfred J. A. Peterson
and John D. Gord.
BY
G. D. Crawford
ATTORNEY

Patented Oct. 10, 1950

2,525,499

UNITED STATES PATENT OFFICE 2,525,499

DISTRIBUTION APPARATUS

Alfred J. A. Peterson, Wilkinsburg, and John D. Gard, Irwin, Pa., assignors to Westinghouse Electric Corporation, a corporation of Pennsylvania Application May 23, 1944, Serial No. 536,940

4 Claims. (Cl. 175—294)

Our invention relates, generally, to electrical distribution apparatus, and it has reference in particular to transformer and switchgear apparatus used in electrical distribution systems.

Generally stated, it is an object of our invention to provide electrical distribution apparatus which is simple and inexpensive to manufacture and is reliable and economical in operation.

More specifically, it is an object of our invention to provide for ventilating and cooling both the transformer and switchgear apparatus of an electrical distribution system so as to enable them to operate as a unit at a plurality of different output levels.

Another object of our invention is to provide for so cooling the switchgear apparatus used with a transformer which operates at a plurality of different output levels, depending on the rate at which the heat is dissipated therefrom, that the switchgear used need not have a rating in excess of the normal output rating of the transformer.

It is an important object of our invention to provide for cooling the switchgear apparatus used in an electrical distribution system in anticipation of the actual heat developed therein by an increase of load, and in accordance with the ambient temperature.

Yet another object of our invention is to provide for cooling the switchgear apparatus used in an electrical distribution system both independently of, and in conjunction with, the cooling of the transformer with which it is associated.

A further object of our invention is to provide for recalibrating the trip means of a circuit breaker so that the proper degree of overload protection may be provided even when the switchgear apparatus including the circuit breaker is operated at different output levels.

It is also an object of our invention to provide different degrees of cooling for the circuit breaker and associated switchgear apparatus used with a transformer in an electrical distribution system so that the circuit breaker may have a normal load rating substantially the same as the normal rating of the transformer and be capable of operation at increased load ratings without reducing the protection afforded thereby.

Still another object of our invention is to provide for cooling a plurality of switchgear units by means of ducts therein which interconnect when the units are assembled in operating relation, and to provide for the passage of a cooling medium through each of the units in a suitable proportion.

It is also an object of our invention to provide for cooling an air-break circuit breaker by means of an air stream which flows in the same direction as an air interrupting air stream.

Other objects will, in part, be obvious and will, in part, be described hereinafter.

In practicing our invention in one of its forms, each of the switchgear units used with a power transformer to provide an electrical distribution center is arranged for operation at a plurality of different load levels by means of a cooling system which comprises main air ducts which are aligned when the units are assembled in operating relation. Distribution air ducts lead off from the main air ducts in each unit so as to provide upwardly rising air streams in the region of the main circuit-breaker contacts, primary disconnecting contacts, and the circuit-breaker bus. Cooling is effected by means of coordinated blowers associated with the switchgear and the transformer. Separate control means are provided for initially effecting operation of the switchgear blower before the transformer blower so as to anticipate the heating effects of an increased load or increased ambient temperature on the switchgear. Tripping of the circuit breaker is effected at different operating levels having predetermined relations to the different load levels of the apparatus, so as to provide the maximum protection.

For a more complete understanding of the nature and scope of our invention, reference may be had to the following detailed description which may be studied in connection with the accompanying drawing, in which.

Figure 1:
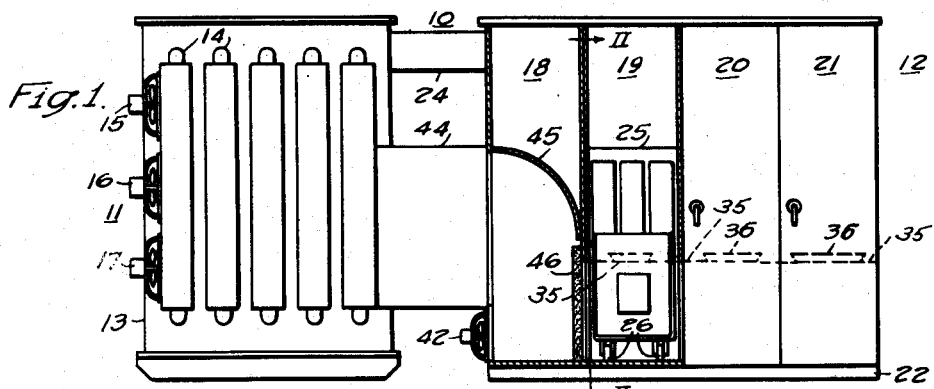
Figure 1 is a side elevational view, partly in section, of electrical distribution apparatus embodying the principal features of the invention.

Referring to Fig. 1, the reference numeral 10 may denote, generally, an electrical distribution unit comprising a power transformer 11 which is disposed to be used in connection with switchgear apparatus 12 for operation in an electrical distribution system.

The transformer 11 may be provided with a tank 13 having means such as the radiators 14 for increasing the rate of heat dissipation. In order to provide for increasing the capacity of the transformer over its normal rating, additional means may be provided in a well known manner for increasing the rate of heat dissipation such as, for example, suitable pump means (not shown) for increasing the rate of flow of the transformer oil to the radiators, and/or a plurality of blowers or fans 15, 16 and 17 which may be mounted on or adjacent to the radiators for directing an air blast thereon.

The switchgear apparatus 12 may be of any suitable type comprising, for example, a plurality of housings 18, 19, 20 and 21 which may be positioned in side-by-side relation upon a common base 22. The housing 18 which may be designated as the incoming bus compartment, may house electrical connections extending to the transformer through a suitable conduit 24, while the remaining housings may contain one or more circuit breakers 25, such as shown in the housing 19 and the usual electrical meters, connections and circuits associated therewith.

Figure 2:
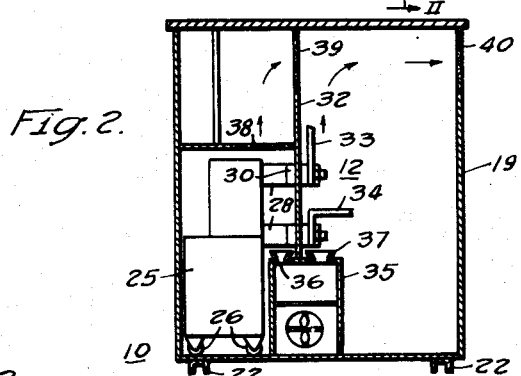
Fig. 2 is a sectional view taken along the line II—II of Fig. 1.

As shown in Figs. 1 and 2, the circuit breakers 25 may be of the drawout type being, for example, mounted on rollers 26 and provided with connectors or disconnecting contacts 28 for engaging a plurality of stationary contact members 30 which may be mounted on a partition 32 positioned intermediate the front and rear ends of the housings. Suitable electrical connections may be made to the circuit breakers by means of incoming and outgoing buses designated, generally, by the numerals 33 and 34, respectively, and which may be positioned in the rear portions of the housings.

In order to provide for utilizing circuit breakers having normal ratings substantially equal to that of the transformer, and yet capable of operating at higher load levels along with the transformer, suitable means may be provided for increasing the rate of heat dissipation of the circuit breakers, circuit-breaker contacts and the distribution buses. For example, a main air duct 35 may be provided in each of the circuit-breaker housings having distribution ducts 36 and 37 for directing streams of air against the circuit-breaker contacts, buses, etc.

The main air ducts 35 may be positioned intermediate the front and rear ends of the housings and substantially in line with the partition 32 so that the distribution ducts 36 and 37 lie on opposite sides of the partition. The ducts 35 may be so positioned in the different circuit-breaker housings that they are substantially aligned, so as to form a continuous ventilating duct when the housings are mounted on the base 22. The distribution ducts may be of such sizes in the different compartments or housings and so arranged that the amount of air supplied to each of the circuit breakers is substantially proportional to their ratings. This may be accomplished by making the distribution ducts in the housings 19, 20 and 21 progressively larger to compensate for the greater distance the air must travel to reach its objective, or by means of suitable dampers or regulated openings. Suitable screened openings 38, 39 and 40 may be provided in the partitions and back of the upper portions of the housing for exhausting the air from the housings.

In order to provide for directing a stream of air through the ventilating ducts 35, means, such as the auxiliary blower 42, may be utilized. The blower 42 may be located in any suitable position being, for example, mounted on the outer wall of the housing 18 adjacent the lower end thereof and substantially in alignment with the duct 35.

With a view to providing additional cooling of the switchgear apparatus when the transformer 11 is operating under forced cooling, such as when the blowers on the transformer are operating, means may be provided for effecting additional cooling of the switchgear apparatus, such as the air duct 44 and shield 45 which may be provided for directing at least a portion of the air stream produced by the transformer blowers into the main air ducts 35 of the switchgear apparatus. Filters 46 may be provided in the housing 18 for preventing the influx of atmospheric dirt into the circuit breaker housings.

Figure 3:
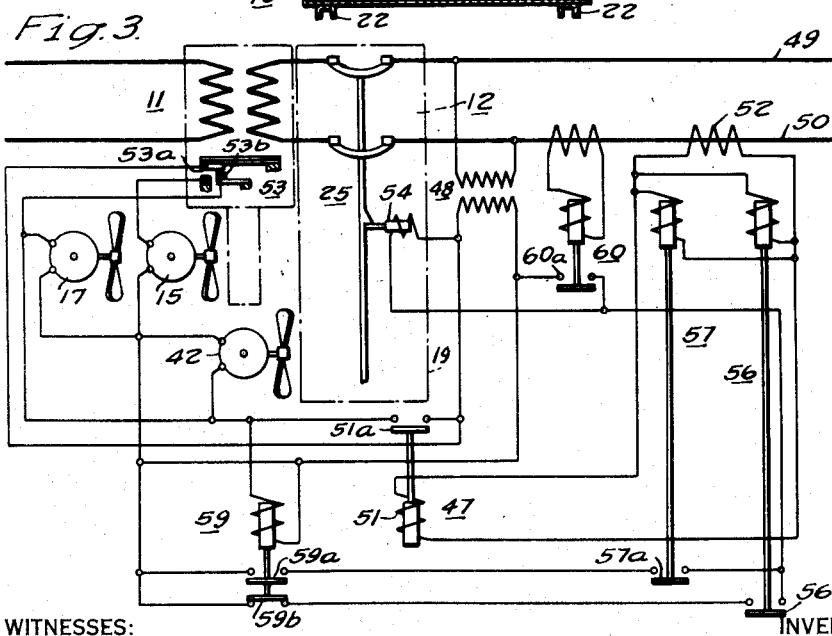
Fig. 3 is a diagrammatic view of a distribution system embodying the invention and showing a control system for the cooling means.

Referring to Fig. 3, the reference numeral 10 may denote, generally, distribution apparatus similar to that shown in Figs. 1 and 2, including the transformer 11 and the switchgear apparatus 12 which is represented only by the circuit breaker 25 in the housing 19 for the purposes of simplification. The blower 16 of Fig. 1 is omitted for purposes of simplification since it is connected and operates the same as the blower 17 which represents both blowers. In order to provide for controlling the operation of the auxiliary switchgear blower 42, means such as the control relay 47 may be provided. Since the switchgear apparatus usually has a lower thermal capacity than the associated transformer, and hence has a more rapid temperature rise, it is usually desirable to provide for cooling the switchgear before it is necessary to start the transformer cooling means. The control relay 47 may, therefore, be used for effecting the energization of the blower 42 from a suitable source of electrical energy independently of the transformer blower motors, such as, for example, from a control transformer 48 and conductors 49 and 50 which are disposed to be connected to the transformer 11 by the circuit breaker 25. Operation of the control relay 47 may be effected by energizing the operating winding 51 thereof from a current transformer 52 whenever the current in the conductors 49 and 50, and hence the switchgear apparatus 12 exceeds the normal rating of the circuit breaker 25.

The operation of the plurality of transformer blowers represented, for example, by the blower 15, may be effected by means of any suitable temperature responsive device responsive to a predetermined temperature of the transformer oil or windings such as, for example, a thermostatic control switch 53 of the bimetallic type. All of the transformer blowers may be energized under the control of the thermostatic control switch 53 when a predetermined temperature is reached or, if desired, they may be energized separately or in any predetermined grouping at different temperatures by one or more such temperature-responsive switches. If desired, one or more of the transformer blowers such as, for example, the blowers 16 and 17, which for purposes of simplicity may be represented by the blower 17, may be operated together with, or in place of, the auxiliary switchgear blower 42 under the control of the load-responsive control relay 47 for effecting cooling of the switchgear apparatus as soon as the load increases above normal and before the thermal-responsive bimetallic switch 53 of the transformer operates. Protection against unusually high ambient temperatures which may result in overheating of the switchgear with normal load conditions, may be provided by means of auxiliary temperature control such as, for example, an external thermostat or auxiliary contact members 53b or the bimetallic switch 53, which close whenever the ambient temperature rises above a predetermined value. Either the blower 42 or the blowers 16 and 17, or all of them may be controlled by the contact members 53b.

In order to provide for tripping the circuit breaker 25 at a predetermined point in excess of the particular load level at which the distribution unit may be operating, when there are a plurality of such load levels, suitable means may be provided for changing the operating point of the trip means 54 of the circuit breaker. For example, the trip means 54 may be controlled by the low-current and high-current relays 56 and 57, respectively, which operate at different values of current corresponding to the different load levels at which the system operates. A calibrating relay 59 may be provided for rendering either the low-current or the high-current relay effective, depending on whether or not the control relay 47 has operated to turn on the blowers and increase the output rating of the switchgear. A trip relay 60, may be provided for operating the trip means 54 to open the circuit breaker 25 in the event that the load current exceeds a predetermined safe value.

With the circuit breaker 25 closed and the system operating as shown in Fig. 3, any increase in the current in the conductors 49 and 50 above the normal rating of the circuit breaker 25 causes operation of the control relay 47 to close contact members 51a. The auxiliary blower 42 and/or the transformer blowers 16 and 17 are thereby connected to the control transformer 48 so as to provide a stream of air through the ventilating ducts 35 for cooling the circuit-breaker contacts, contact members and buses, thereby increasing the load level at which the circuit breaker may operate.

At the same time, the calibrating relay 59 is energized through the circuit completed by the control relay 47. The calibrating relay 59 operates, opening its contact members 59b which are connected in series circuit relation with the contact members 56a of the low-current relay. Operation of the trip means 54 by means of the low-current relay 56 is thereby prevented. At the same time, an energizing circuit is set up through closure of the calibrating relay contact members 59a which may be completed by operation of the high-current relay 57. In this manner, operation of the trip means 54 may be effected for opening the circuit breaker at different predetermined values of load current. This enables adequate protection to be provided since tripping of the circuit breaker may be effected at a given predetermined value, say, for example, 125% of the load current at each of the different load levels.

Whenever the temperature of the transformer 11 reaches a predetermined value for which the thermostatic control switch 53 may be set, its contact members 53a close to connect the blower motors 15, 16 and 17 to the control transformer if the blower motors 16 and 17 are not connected for operation under the control of the control relay 47. The rating of the transformer 11 may thereby be increased and at the same time a stream of air is directed through the ducts 44 and 35 for increasing the rate of heat dissipation of the circuit breakers and buses so that they may safely operate at the higher load level.

If the load current should increase further and exceed the value for which the high-current relay 57 is calibrated, the relay 60 operates, closing contact members 60a to provide an energizing circuit for the trip means 54, thereby opening the circuit breaker 25. In the event of an exceedingly high overload, the trip relay 60 may operate to energize the trip means even before the thermostatic control switch 53 has a chance to operate, thereby protecting the transformer and switchgear against an excessive overload which might damage the transformer and switchgear before the cooling effects of the blowers become effective.

In the event that the surrounding or ambient temperature increases, the auxiliary contact members 53b of the thermostatic control switch close, and auxiliary cooling is provided for the transformer and switchgear through operation of the blower motors 16 and 17, either alone or together with the auxiliary blower motor 42.

From the above description and the accompanying drawing, it will be apparent that we have provided in a simple and effective manner for operating the switchgear apparatus and transformer in a distribution system at different load levels. By providing auxiliary cooling for the circuit breaker which operates in advance of the transformer cooling, sufficient protection is afforded the switchgear which has a relatively low thermal capacity as compared to the transformer so as to prevent overheating thereof before the temperature of the transformer reaches a dangerous operating value.

Accordingly, it is possible to provide the transformer with circuit breakers having a normal rating which need not be in excess of the normal rating of the transformer. As soon as the blowers begin to operate on the transformer, additional ventilation for the switchgear is provided so that the switchgear may continue to operate at the higher output level provided by the transformer. By providing for recalibrating the trip means, adequate protection is provided under all conditions even though the apparatus operates at different load levels.

Since certain changes may be made in the above description and different embodiments of the invention may be made without departing from the spirit or scope thereof, it is intended that all matter shown in the accompanying drawing or described in the attached claims shall be considered as illustrative and not in a limiting sense.

We claim as our invention:

1. A distribution unit comprising, a transformer, switchgear apparatus connected in load carrying relation with the transformer including a circuit breaker having current trip means operable to open the circuit breaker when the load current increases a predetermined amount above the operating level, cooling means for increasing the relative heat dissipation of the switchgear apparatus and transformer to permit it to operate at the increased rating of the transformer, and means responsive to an increase in rating for changing the current value at which the trip means operates.

2. Electrical distribution apparatus comprising, a transformer having cooling means for increasing the capacity thereof, means responsive to predetermined temperature conditions of the transformer for effecting operation of the cooling means, switchgear apparatus connected in series circuit relation with the transformer including a circuit breaker having current responsive trip means for opening the circuit breaker, means for cooling the switchgear apparatus, control means responsive to predetermined load conditions for effecting operation of said cooling means independently of the transformer, and means cooperative with said control means for controlling the operation of the trip means to open the circuit breaker at different current levels under different operating conditions.

3. Switchgear apparatus comprising, a circuit breaker having current responsive trip means, control means for increasing the heat dissipation of the circuit breaker to permit it to be operated at a higher load level, and trip control means controlling the operation of the trip means operable under the control of the control means to change the tripping point of the circuit breaker in accordance with the operating load level of the circuit breaker.

4. Electrical distribution apparatus comprising, a transformer having a plurality of blowers operable to increase the operating load level of the transformer, means responsive to an operating temperature of the transformer for controlling the operation of one of the blowers to effect ventilation of the transformer only, switchgear apparatus connected in series circuit relation with the transformer including a circuit breaker having current responsive trip means and provided with a duct associated with another of the transformer blowers for cooling the switchgear apparatus and transformer, control means for effecting operation of the trip means at different values of load current, and relay means responsive to predetermined load conditions for controlling the operation of the said another blower and the control means.

ALFRED J. A. PETERSON.
JOHN D. GARD.

REFERENCES CITED

The following references are of record in the file of this patent:

UNITED STATES PATENTS

| Number | Name | Date |
|---|---|---|
| 853,263 | Randall | May 14, 1907 |
| 853,375 | Randall | May 14, 1907 |
| 1,315,996 | Simmon | Sept. 16, 1919 |
| 1,764,305 | Hill | June 17, 1930 |
| 1,959,513 | Weyant | May 22, 1934 |
| 2,024,742 | Parsons | Dec. 17, 1935 |
| 2,039,028 | Pierson | Apr. 28, 1936 |
| 2,265,544 | Peters | Dec. 9, 1941 |
| 2,302,395 | Seaman | Nov. 17, 1942 |
| 2,394,060 | Holmes | Feb. 5, 1946 |
| 2,403,072 | Gates | July 2, 1946 |